July 12, 1932.  F. S. CARVER  1,867,137
CAGE
Filed July 31, 1928
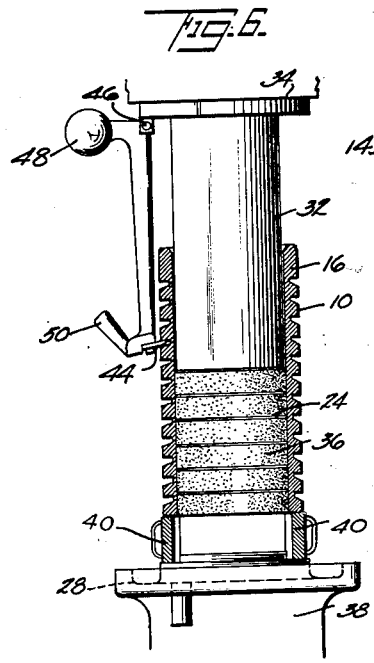
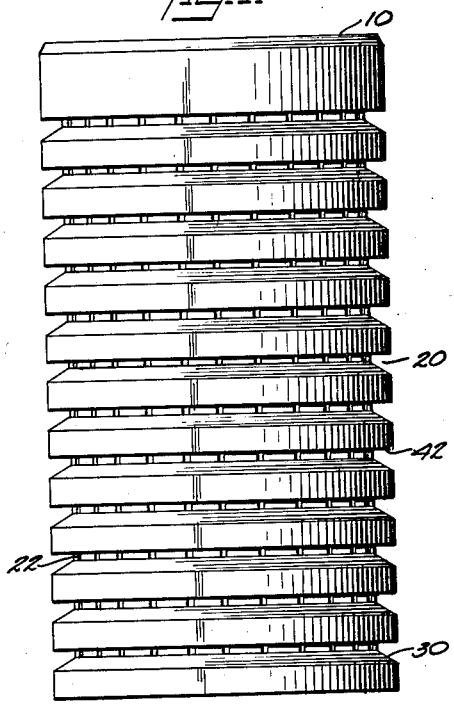
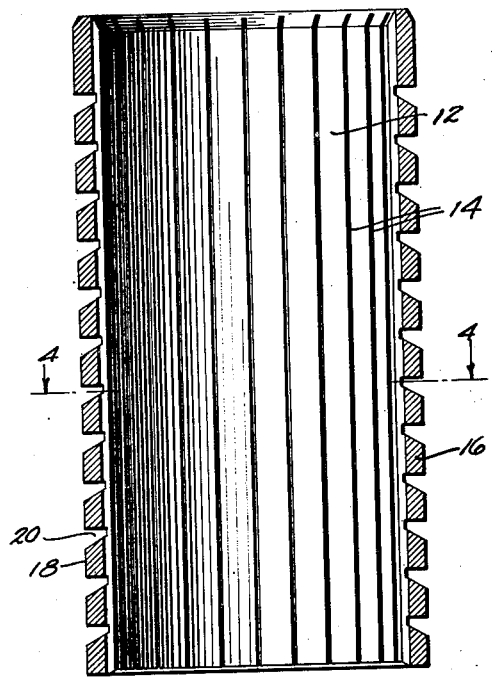
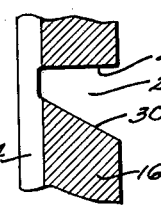
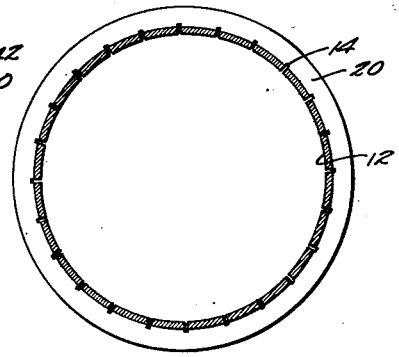
INVENTOR
FRED S. CARVER
BY
Dyke, Holden and Schaire
ATTORNEYS Patented July 12, 1932

1,867,137

UNITED STATES PATENT OFFICE

FRED S. CARVER, OF EAST ORANGE, NEW JERSEY

CAGE

Application filed July 31, 1928. Serial No. 296,530.

My invention is of a press cage for cage presses.

My improved press cage is made as a hollow cylinder, preferably a cylinder of circular cross section, adapted to receive the material to be pressed, with preferably a series of filter pads inserted during the filling of the cage; and the principal object of the invention is the provision of an integral or one piece press cage with simple and efficient outlet passages formed therein for expressed fluid.

A cage embodying the invention is illustrated in accompanying drawings in which:

Fig. 1 is a side view;
Fig. 2 a vertical section;
Fig. 3 a fragmentary enlargement of the right hand part of Fig. 2;
Fig. 4 a horizontal section on line 4—4 of Fig. 2;
Fig. 5 a fragmentary enlargement of part of Fig. 4; and
Fig. 6 a vertical section of the cage in use.

The cage is indicated generally by reference character 10 and it is preferably a one-piece integral cage and may be formed as a forging tube or casting. The cylindrical bore wall 12 is provided with narrow, preferably elemental, grooves 14 extending part-way, preferably about one-fourth of the way, through the cage wall 16. Longitudinal grooves 14 of elemental formation, that is parallel to the longitudinal axis of the cage, are preferred because of the ease with which such grooves can be milled, or otherwise cut or formed particularly in metal. The grooves 14 are quite narrow to avoid clogging by the oil meal or other material being pressed. By forming the grooves 14 in the manner described, same can be readily made of uniform width, which is important in operating the press to avoid localized extrusion of "forts" which are unavoidable when the slots are of irregular width.

The outer wall 18 of cage 10 is provided with preferably annular grooves 20, deep enough to intersect the longitudinal internal grooves 14.

At the points of intersection of the longitudinal inner grooves 14 with the annular outer grooves 20 small holes 22 extend through the cage wall and establish communication between the internal and external grooves 14 and 20.

Expressed fluid finding its way to the internal grooves 14, either directly through the mass of material being pressed or through the filter pads 24 interposed between batches or layers of press-material, and along grooves 14 to these openings 22, pass therethrough and flow down the outside of the cage to suitable collecting means such as a trough 28. The lower walls of grooves 20 preferably taper outwardly and downwardly as indicated at 30, and in this way any tendency of the expressed fluid to collect in the grooves 20 can be eliminated.

When the press piston 32 is dependent from the press head 34 the press cake 36 can be ejected from the cage 10 by causing the ram 38 to elevate the cage alone while the press cake is held down by the piston. When the ram 38 is being backed down to permit the insertion of a block 40 for this purpose, a temporary means of support for the cage 10 and its contents is desirable. By making the upper walls 42 of the annular grooves 20 horizontal or practically so, a swinging hook 44 urged to turn about a pivot 46 toward cage 10 by weight 48 can enter the groove 20 and support the cage by engagement under the substantially horizontal top wall 42 of groove 20.

The downward incline or taper of the bottom wall 30 of groove 20, in addition to being readily self-clearing of expressed fluid, serves the function of a cam to push out the hook 44 as the cage is moved upwardly relatively toward the press head 34. Thus, hook 44, while permitting the cage 10 to move freely upwardly, holds it suspended by engagement with whichever groove 20 is opposite to and engaged by hook 44. This constitutes practically a rack and pawl relation by which the cage is automatically retained at substantially any elevated position, unless manually released. The cage is freed after all the cake 36 is out of the cage by manual retraction of hook 44 by handle 50, whereupon the cage 10 moves down with the ram 38.

Cage 10 can be readily made from any desired material. Where high pressures are used, it is preferably made of steel. While cast material can be used if desired, steel forgings are preferable, as with forged cages, uniformly high strength can be obtained and local weaknesses such as may be present in castings are avoided.

Inasmuch as high circumferential strength is needed for withstanding high pressures, the longitudinally extending internal grooves 14 are relatively shallow. This also tends to prevent their clogging and facilitates cleaning. The longitudinal strains are relatively small, and this permits the outer grooves 20 to be made quite deep without introducing an objectionable cause of weakness for the purposes to which the cage is put in use.

It will be seen that a press cage constructed in accordance with my invention is exceedingly simple, strong and rigid and readily constructed, and while inexpensive is highly efficient, free from objectionable clogging and readily cleaned.

Modifications and changes can be resorted to within the scope of my claims by which I intend to cover all that is new herein.

I claim:

1. A substantially integral press cage having substantially longitudinal interior grooves and substantially circumferential exterior grooves in communication with one another at the crossings thereof.

2. A one-piece hollow cage of circular transverse section having interior substantially lengthwise grooves and grooved around its outer surface so as to cross and communicate with the interior grooves for fluid outlet.

3. A press cage of substantially cylindrical formation comprising a series of exterior superposed, spaced-apart, substantially identical ring portions, and an interior wall portion provided with a plurality of spaced narrow longitudinally extending grooves of substantially the full length of the cage and opening outwardly into the inter-ring spaces, all of said portions being in solid and permanently fixed relation to each other and constituting a single integral metallic member.

In testimony whereof, I have signed my name hereto.

FRED S. CARVER.